Patented Dec. 23, 1924.

1,520,197

UNITED STATES PATENT OFFICE.

HENRY G. MEEKS, OF PALMETTO, FLORIDA, ASSIGNOR OF ONE-HALF TO FREDERICK STEVENSON, OF PALMETTO, FLORIDA.

SPRAY FOR TOMATO RUST.

No Drawing. Application filed June 9, 1923. Serial No. 644,489.

*To all whom it may concern:*

Be it known that I, HENRY G. MEEKS, a citizen of the United States, residing at Palmetto, in the county of Manatee and State of Florida, have invented certain new and useful Improvements in Sprays for Tomato Rust, of which the following is a specification.

This invention relates to sprays for spraying vegetables, and particularly to a spray mixture designed to control or prevent what is known as nail head rust on tomato plants.

The spray is made from the following formula in approximately the following proportions:—

|  | Lbs. |
|---|---|
| Epsom salts | 4 |
| Sulphur | 1 |
| Nitrate of soda | 2 |
| Hydrated lime | 6 |

These materials are mixed in dry form and when used the powder thus formed is dissolved in 50 gallons of water, to which has been added 1¼ quarts of aqua ammonia (26°). The solution is then to be sprayed upon the tomato plants in the usual manner. The dry ingredients will be sold in pulverized form with instructions to the purchaser to mix with the necessary amount of water and to add ammonia thereto.

The action of the ingredients in preventing what is known as nail head rust on plants is as follows: The nitrate of soda tends to start the plant growing immediately after its application. The sulphur dries the spot of rust and keeps it from spreading. The epsom salts acts with the soda but lasts longer, permitting the plants to be sprayed at greater intervals of time. While I have before referred to hydrated lime, either flour or fuller's earth can be substituted therefor. This finely divided or communited material such as lime, flour or fuller's earth acts to form a pasty mass which holds the material on the plant.

I regard as equivalent for the lime anything that will form a paste with the water and other materials. The spray, the formula of which is given above, is applicable to any form of rust that forms on any kind of vegetable or plant that is subject to rust, but is particularly applicable to tomatoes. The ammonia which is added to the water stimulates the plant growth immediately after applying the spray and thus secures quicker results.

I claim:—

1. A composition for forming a tomato spray including epsom salts, sulphur, nitrate of soda, and hydrated lime pulverized and thoroughly mixed.

2. A composition for forming a tomato spray including the following ingredients in the following proportions, namely:—

|  | Lbs. |
|---|---|
| Epsom salts | 4 |
| Sulphur | 1 |
| Nitrate of soda | 2 |
| Hydrated lime | 6 |

3. A composition for spraying tomato plants comprising epsom salts, sulphur, nitrate of soda, hydrated lime, aqua ammonia, and water.

4. A composition for forming a tomato spray including epsom salts, sulphur, and a finely pulverized material which will form a paste with water.

5. A composition for spraying tomato plants comprising epsom salts, sulphur, nitrate of soda, a finely pulverized material which with the water will form a pasty mass, aqua ammonia, and water.

6. A composition for forming a tomato spray including the following ingredients in the following proportions, namely epsom salts four pounds, sulphur one pound, nitrate of soda two pounds, and a finely comminuted material which will form a paste with water six pounds.

In testimony whereof I affix my signature.

HENRY G. MEEKS.